United States Patent
Marupaduga (10) Patent No.: US 11,659,543 B1
(45) Date of Patent: May 23, 2023

(54) DYNAMIC SSB BEAM ALLOCATION

(71) Applicant: T-Mobile Innovations LLC, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 100 days.

(21) Appl. No.: 17/397,659

(22) Filed: Aug. 9, 2021

(51) Int. Cl.
*H04W 72/12* (2023.01)
*H04W 72/04* (2023.01)
*H04W 72/121* (2023.01)
*H04W 72/044* (2023.01)

(52) U.S. Cl.
CPC ....... *H04W 72/121* (2013.01); *H04W 72/046* (2013.01); *H04W 72/048* (2013.01); *H04W 72/1231* (2013.01)

(58) Field of Classification Search
CPC . H04W 72/121; H04W 72/04; H04W 72/044; H04W 72/046; H04W 72/048; H04W 72/1231
See application file for complete search history.

(56) References Cited

U.S. PATENT DOCUMENTS

| | | | | |
|---|---|---|---|---|
| 11,363,470 | B1* | 6/2022 | Vijayakumar | H04W 24/02 |
| 2019/0104507 | A1* | 4/2019 | Majmundar | H04W 36/06 |
| 2020/0275493 | A1* | 8/2020 | Park | H04W 76/27 |
| 2020/0343942 | A1* | 10/2020 | Ronkainen | H04B 7/024 |
| 2021/0315022 | A1* | 10/2021 | Xu | H04W 72/044 |
| 2022/0182954 | A1* | 6/2022 | Kumar | H04W 56/0015 |
| 2022/0352962 | A1* | 11/2022 | Huang | H04B 7/088 |

FOREIGN PATENT DOCUMENTS

WO  WO-2020254922 A1 * 12/2020
WO  WO-2022069054 A1 *  4/2022

* cited by examiner

*Primary Examiner* — Robert C Scheibel
(74) *Attorney, Agent, or Firm* — Shook, Hardy & Bacon L.L.P.

(57) ABSTRACT

Systems and methods are provided for dynamically allocating SSB beams. It is determined that a relay device and a plurality of user devices are communicating with a cell site by way of a first beam. A quantity of user devices communicating by way of the first beam is then determined. It is determined that this quantity of user devices exceeds a predetermined threshold. A second beam that has a signal strength that is lower than the first beam is identified. The signal strengths are compared between the first beam and the second beam. It is determined that the difference between the signal strength of the first beam and the signal strength of the second beam is below a predetermined amount. The second beam is then dynamically reassigned to at least a portion of the user devices.

20 Claims, 5 Drawing Sheets

DYNAMIC SSB BEAM ALLOCATION

SUMMARY

The present disclosure is directed, in part, to reallocating SSB beams to one or more user devices when a plurality of user devices and one or more relay devices are served by the same beam in a given sector. Typically, relay devices, such as a small cell, consumes more network resources, as relay devices may serve (e.g., provide backhaul) user devices. Thus, when a relay device is being served by a given beam, aspects provided herein may instruct one or more user devices (e.g., devices that are not relay devices) to use a different beam. In aspects, this different beam may be one that has a lower signal strength than the original beam, but whose signal strength is within a predetermined threshold of the original beam being used by the relay device.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, beamforming is commonly used by telecommunications companies for many reasons. Some of those reasons include the ability to reach select user devices (e.g., user devices at the cell edge), and to provide better speeds to user devices. Synchronized signal blocks (SSB) is a signal that is always on in relation to 5G. For instance, 5G NR only broadcasts a minimum amount of cell-specific signals, while all others are UE specific. Typically, each SSB occupies 240 subcarriers (frequency domain) and 4 symbols (time domain). SSBs are transmitted periodically from each cell. In some cases, these transmission patterns are predefined by a standards body, such as 3GPP. In some circumstances, SSBs can be individually beamformed over a certain geographic area. Each cell has a maximum number of SSBs. This maximum number is dependent upon the frequency. For instance, the number of SSBs ("Lmax") is higher for higher frequencies, and lower for lower frequencies. For example, for frequency ranges below 3 GHz, Lmax may equal 4. When millimeter waves are used, Lmax may equal 8.

In aspects, multiple types of devices may be served by a single SSB beam. This could be the case, for example, when one of the SSB beams has the highest signal strength. Naturally, the devices in that sector would select the beam with the highest signal strength. But, when a threshold number of devices are served by a single SSB beam, there may not be enough resources to adequately serve all of the devices.

As such, here, when a threshold number of user devices are served by an SSB beam, and when a relay device is also being served by that same beam, a network component may determine that one or more of the user devices are to be redirected to a different SSB beam broadcast by that cell. In some aspects, when the original SSB beam has the highest signal strengths of all SSB beams being broadcast by a particular cell, the relay device will continue to be served by the original beam, and one or more user devices will be redirected to a different SSB beam. In order to maintain high quality service for the user devices, the network will only redirect user devices to a different SSB beam when the signal strength differential between the original (e.g., first beam) and different (e.g., second beam) SSB beams is below a predetermined threshold.

In aspects, the signal strength differential between the first beam and the second beam is analyzed to determine whether the second beam is adequate for use by user devices currently served by the first beam. If the differential in signal strength, for example, between the first beam and second beam is less than a predetermined threshold, the second beam may be assigned to some of the user devices currently served by the first beam. The advantage to this is that the relay device continues to receive strong signaling with the first beam, while the user devices that are moved to the second beam also receive strong signaling. Having the relay device and a quantity of user devices above a predetermined threshold utilizing the same beam may cause network resources to be spread too thin, decreasing user experience. The reason for a relay device being given priority to be served by the first beam having the highest signal strength is that in some instance, the relay device may provide backhaul service to a small cell, or may attach directly to a base station. As such, the relay device may serve several user devices.

A first aspect of the present disclosure is directed to a system for dynamically allocating SSB beams. The system includes a processor and one or more computer storage hardware devices storing computer-usable instructions that, when used by the processor, cause the processor to perform steps. These steps include determining that a relay device and a plurality of user devices are communicating with a cell site by way of a first beam, and determining that a quantity of user devices of the plurality of user devices exceeds a predetermined threshold. Further, the steps include identifying a second beam that has a signal strength that is lower than the first beam. A difference between the signal strength of the first beam and the signal strength of the second beam is below a predetermined amount. The steps also include dynamically reassign the second beam to at least a portion of the plurality of user devices.

A second aspect of the present disclosure is directed to a method for dynamically allocating SSB beams. The method includes determining that a relay device and a plurality of user devices are communicating with a cell site by way of a first beam, and determining that a quantity of user devices of the plurality of user devices exceeds a predetermined threshold. Further, the method includes identifying a second beam that has a signal strength that is lower than the first beam, determining that a difference between a signal strength of the first beam and the signal strength of the second beam is below a predetermined amount, and dynamically reassigning the second beam to at least a portion of the plurality of user devices while maintaining communications with the relay device by way of the first beam.

According to another aspect of the technology described herein, a method for dynamically allocating SSB beams. The method includes determining that a relay device and a plurality of user devices are attached to a first beam associated with a cell site, determining that a quantity of user devices of the plurality of user devices exceeds a predetermined threshold, and receiving signal strength data from at least one of the plurality of user devices indicating that a second beam associated with the cell site has a signal strength that is lower than the first beam. A difference between the signal strength of the first beam and the signal strength of the second beam is below a predetermined amount. Additionally, the method includes dynamically reassigning the second beam to at least a portion of the plurality of user devices.

Figure 1:
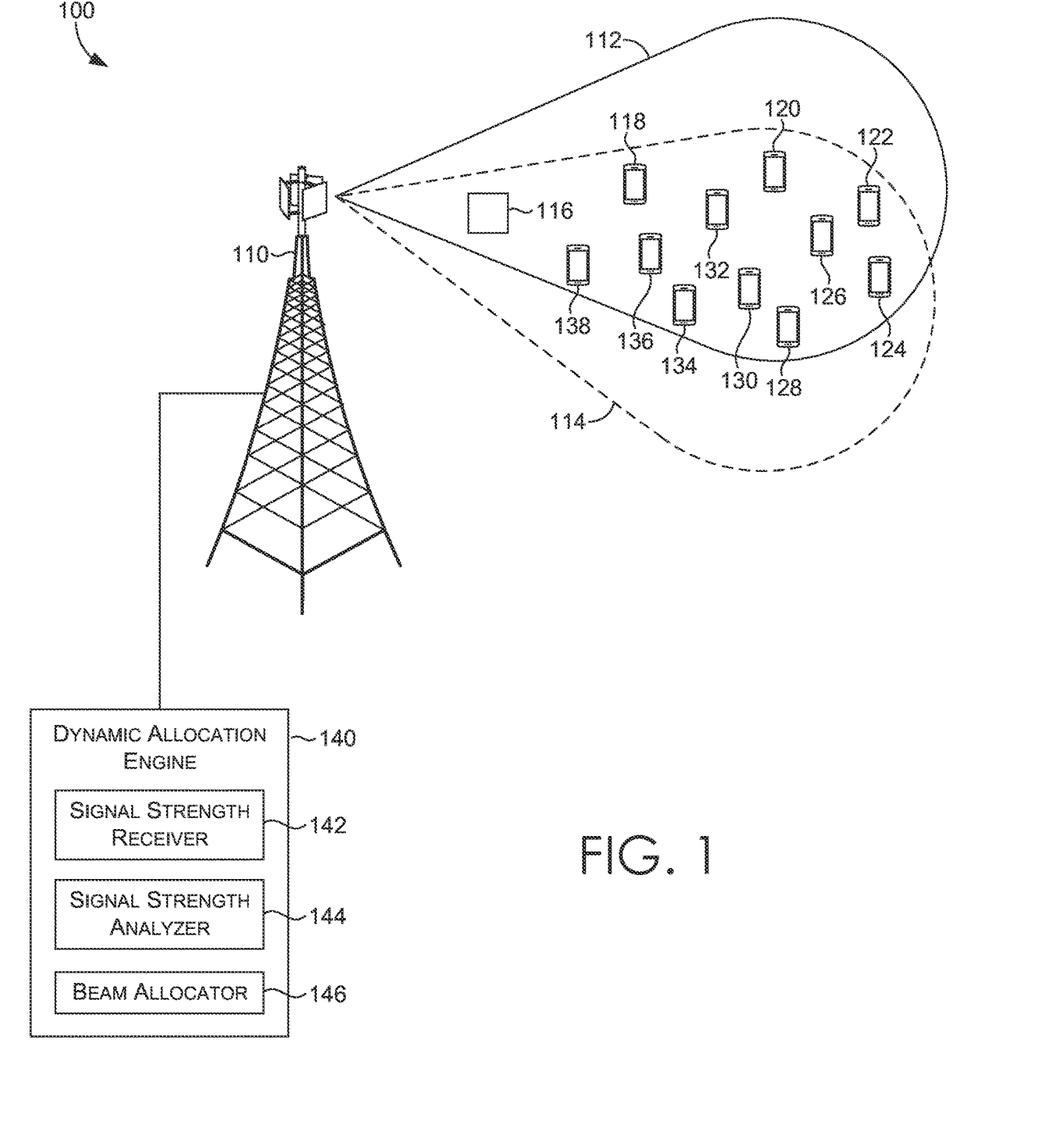
FIG. 1 depicts a diagram of an exemplary computing environment suitable for use in implementations of the present disclosure.

FIG. 1 depicts a diagram of an exemplary network environment 100 suitable for use in implementations of the present disclosure. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 includes node 110, a first beam 112, a second beam 114, a relay device 116, and a plurality of user devices labeled 118-138. In network environment 100, user devices 118-138 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that communicates via wireless communications with node 110 in order to interact with a public or private network.

Figure 5:
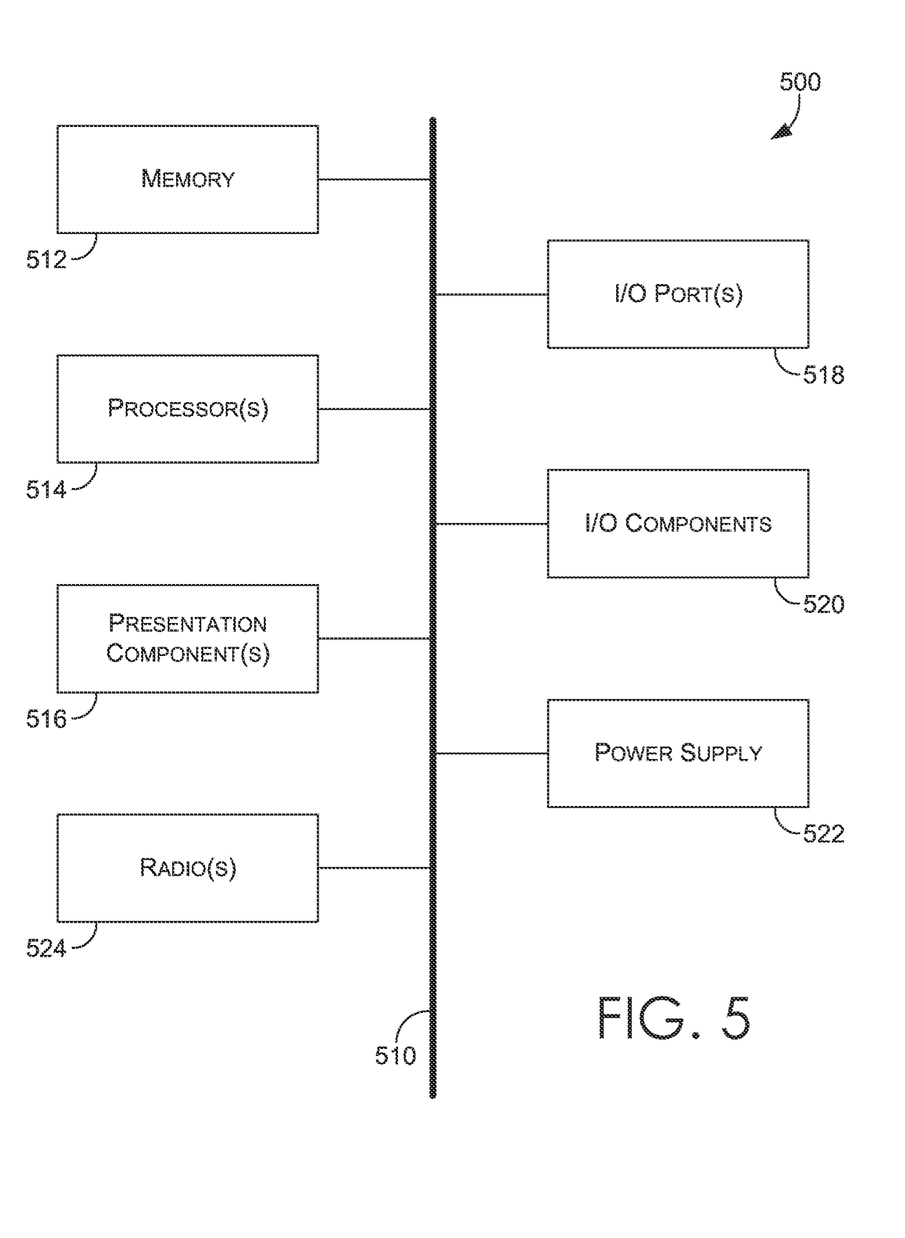
FIG. 5 depicts an exemplary computing environment suitable for use in implementations of the present disclosure.

In some aspects, the user devices 118-138 may correspond to computing device 500 in FIG. 5. Thus, a user device can include, for example, a display(s), a power source(s) (e.g., a battery), a data store(s), a speaker(s), memory, a buffer(s), a radio(s) and the like. In some implementations, a user device (such as user devices 118-138) comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G NR, LTE, CDMA, or any other type of network.

In some cases, user devices 118-138 in network environment 100 can optionally utilize a network (not shown) to communicate with other computing devices (e.g., a mobile device(s), a server(s), a personal computer(s), etc.) through node 110. The network may be a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. The network can include multiple networks, as well as being a network of networks, but is shown in more simple form so as to not obscure other aspects of the present disclosure.

The network can be part of a telecommunication network that connects subscribers to their immediate service provider. In some instances, the network can be associated with a telecommunications provider that provides services (e.g., voice, data, SMS) to user devices, such as user devices user devices 118-138. For example, the network may provide voice and non-voice services, including SMS, and/or data services to user devices or corresponding users that are registered or subscribed to utilize the services provided by a telecommunications provider. The network can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G NR network.

In aspect, relay device 116 may be one of many different types of devices. For exemplary purposes only, relay device 116 may be a device that connect wireless base stations to the corresponding base station controller, such as connecting a cell site to a core network. Some examples include a small cell, picocell, femtocell, or some other device that may boost data signals, accelerate data speeds from the nearest cell tower, and the like. As such, relay device 116 may be providing service to one or more user devices.

In some implementations, node 110 is configured to communicate with user devices, such as user devices 118-138, and relay devices, such as relay device 116, that are located within the geographical area, or cell, covered by the one or more antennas of node 110. Node 110 may include one or more base stations, nodes, base transmitter stations, radios, antennas, antenna arrays, power amplifiers, transmitters/receivers, digital signal processors, control electronics, GPS equipment, and the like. In one aspect, node 110 is a gNodeB, while in another aspect, node 110 is an eNodeB. In particular, user devices 118-138 and relay device 116 may communicate with node 110 according to any one or more of a variety of communication protocols, in order to access the network.

As shown in FIG. 1, user devices 118-138 and relay device 116 are served by the first beam 112, likely because the first beam has been determined to have the best signal strength in that particular sector. However, a second beam 114 is also available to provide coverage to these same devices. According to aspects herein, the system may compare signal strengths of the first beam 112 and the second beam 114 to determine if the difference is below a threshold value. If so, one or more of user devices user devices 118-138 may be moved to the second beam 114 for coverage, as the first beam 112 may not have enough resources to adequately serve the relay device 116 and all user devices 118-138. If the signal strength differential is above the threshold value, the relay device 116 and user devices 118-138 may continue being served by the first beam 112.

Network environment 100 also includes a dynamic allocation engine 140 that comprises a signal strength receiver 142, a signal strength analyzer, and a beam allocator 146. Generally, dynamic allocation engine 140 is responsible for receiving data and determining whether any and how many user devices are to be assigned to a second beam from a first beam. Signal strength receiver 142 receives information from the user devices regarding the signal strengths that are currently being measured by the user devices. For instance, each user device is able to measure current signal strength for any beam whose coverage is available for that user device. As such, in one aspect, user device 138, for example, is able to measure the signal strength for both the first beam 112 and the second beam 114. These measurements may then be sent to the network, such as to signal strength receiver 142. In aspects, some or all of user devices 118-138 may send signal strength information to signal strength receiver 142. This information may be sent at regular intervals of time, for example. While signal strength information is discussed herein, other types of information are contemplated to be within the scope of aspects discussed herein.

Signal strength analyzer 144 utilizes the signal strength information from signal strength receiver 142 and compares signal strength information received for the first beam 112 to signal strength information received for the second beam 114. This information that is compared may be from a single device, or may be from a group of devices. In aspects, if the difference between these signal strength values is less than a predetermined threshold, some or all of user devices 118-138 may be assigned to the second beam 114 from the first beam 112, as the quality and user experience difference is minimal or even unnoticeable to the user. Relay device 116 continues to be serviced by the first beam 112 with the higher signal strength. In aspects, if the difference between these signal strength values is greater than the predetermined threshold, user devices 118-138 are not moved to being serviced by second beam 114, but instead stay with first beam 112. Beam allocator 146 is responsible for dynamically allocating different beams to the user devices 118-138 based on the analysis performed by signal strength analyzer 144.

Figure 2:
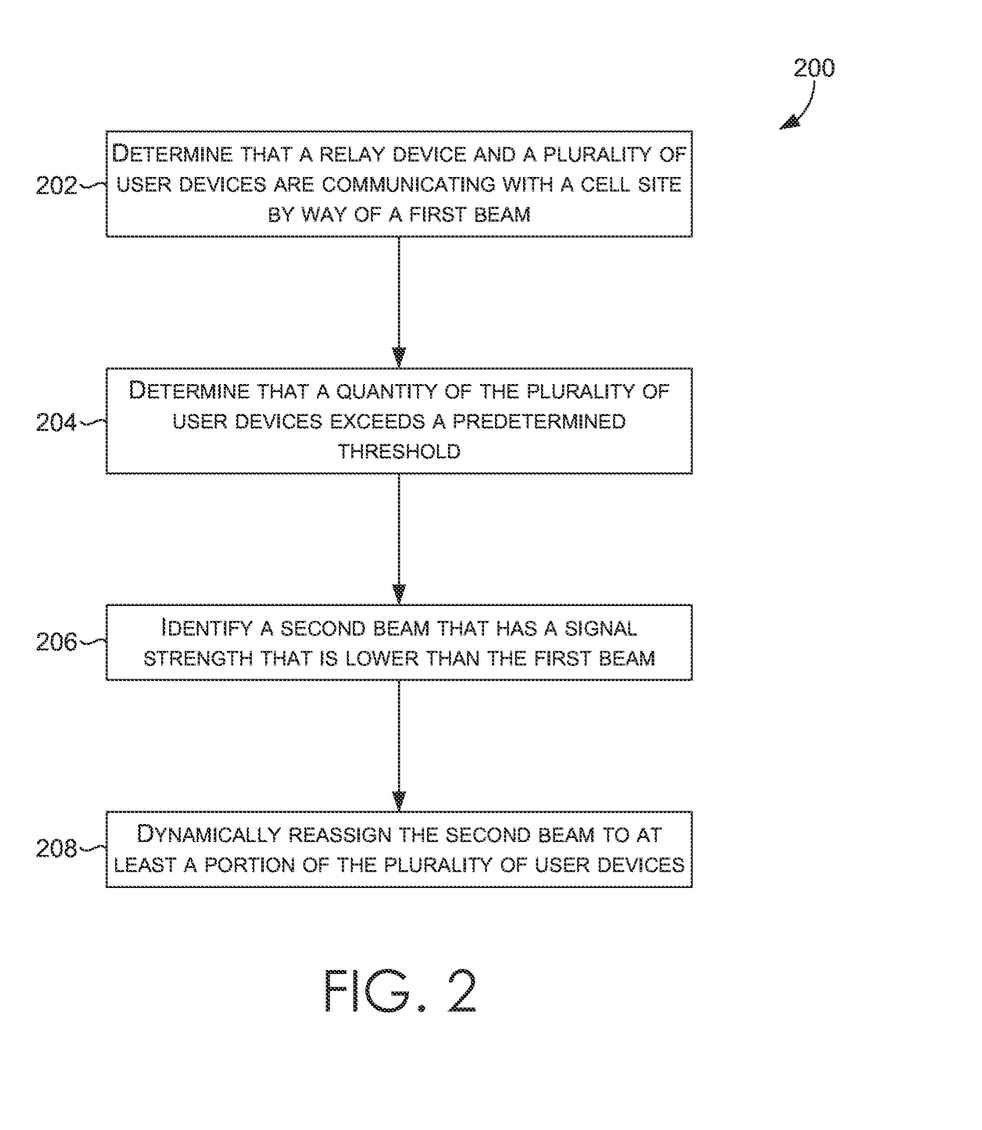
FIGS. 2-4 depict flow diagrams of exemplary methods for dynamically allocating SSB beams, in accordance with aspects herein.

FIG. 2 depicts a flow diagram of an exemplary method 200 for dynamically allocating SSB beams, in accordance with aspects herein. At block 202, it is determined that a relay device (e.g., small cell, picocell, femtocell) and a plurality of user devices are communicating with a cell site by way of a first beam. At block 204, it is determined that a quantity of user devices of the plurality of user devices exceeds a predetermined threshold. In some instances, these user devices and the relay device may be capable of utilizing 5G. At block 206, a second beam is identified that has a signal strength that is lower than the first beam. In some aspects, the first and second beams are associated with the same cell site. A signal indicating that the signal strength of the second beam may be received, for example, from one of the user devices of the plurality of user devices. In some instances, both the first and second beams are SSB beams. At block 208, the second beam is dynamically reassigned to at least a portion of the plurality of user devices, and in some cases all of the plurality of user devices. In some aspects, the relay device is not assigned the second beam, but instead continues utilizing the first beam. This may be the case, in some instances, because the relay device consumes more network resources than the user devices, as the relay device may be serving a set of user devices by providing backhaul services.

Figure 3:
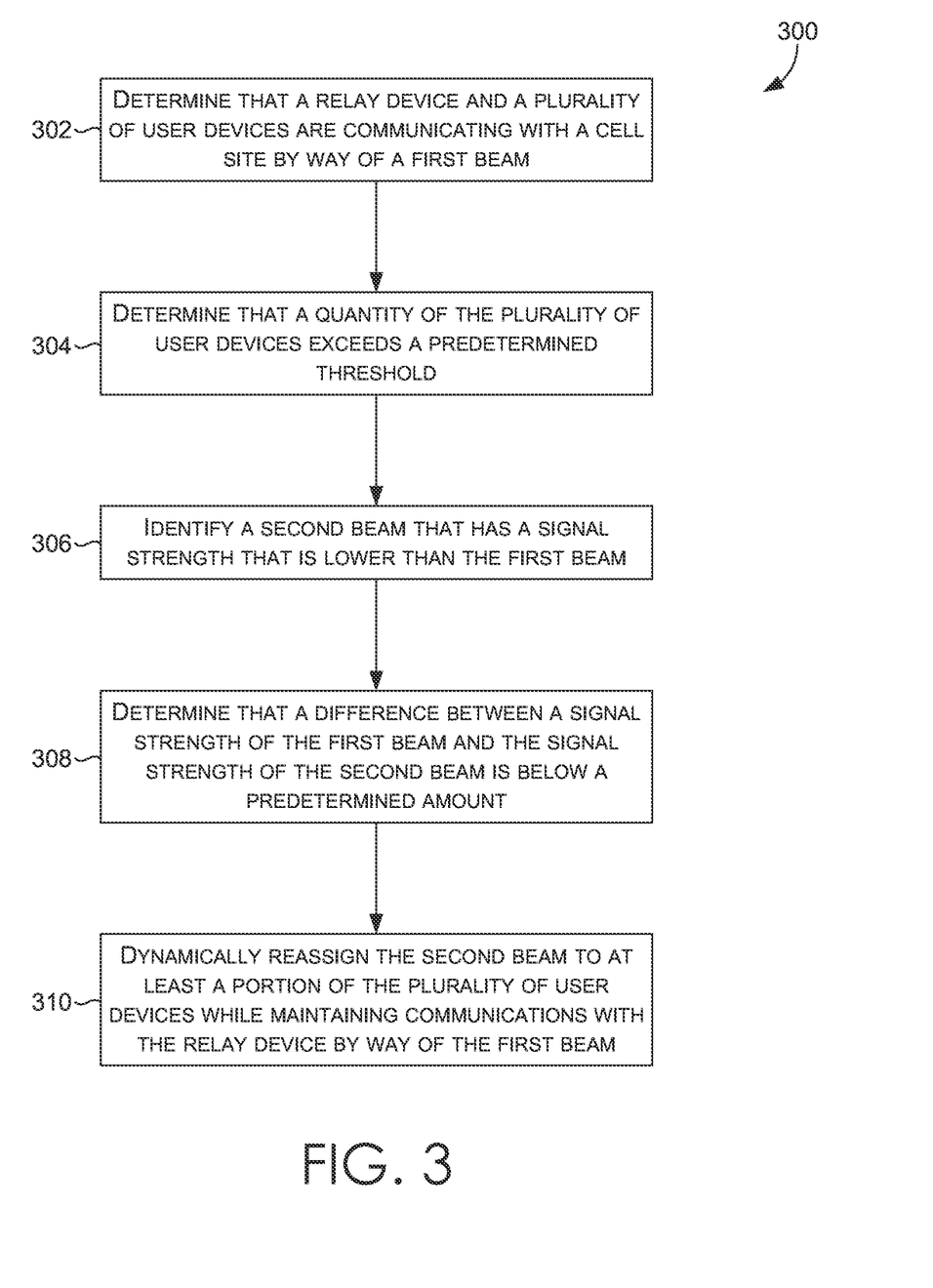

Turning to FIG. 3, a flow diagram is depicted of an exemplary method 300 for dynamically allocating SSB beams, in accordance with aspects herein. At block 302, it is determined that a relay device and a plurality of user devices are communicating with a cell site by way of a first beam. At block 304, it is determined that a quantity of the plurality of user devices exceeds a predetermined threshold. At block 306, a second beam is identified that has a signal strength that is lower than the first beam. In some aspects, the second beam is identified as a result of receiving signal strength information from at least one of the user devices currently using the first beam. At block 308, it is determined that the difference between a signal strength of the first beam and the signal strength of the second beam is below a predetermined amount. At block 310, the second beam is dynamically reassigned to at least a portion of the plurality of user devices while maintaining communications with the relay device by way of the first beam.

Figure 4:
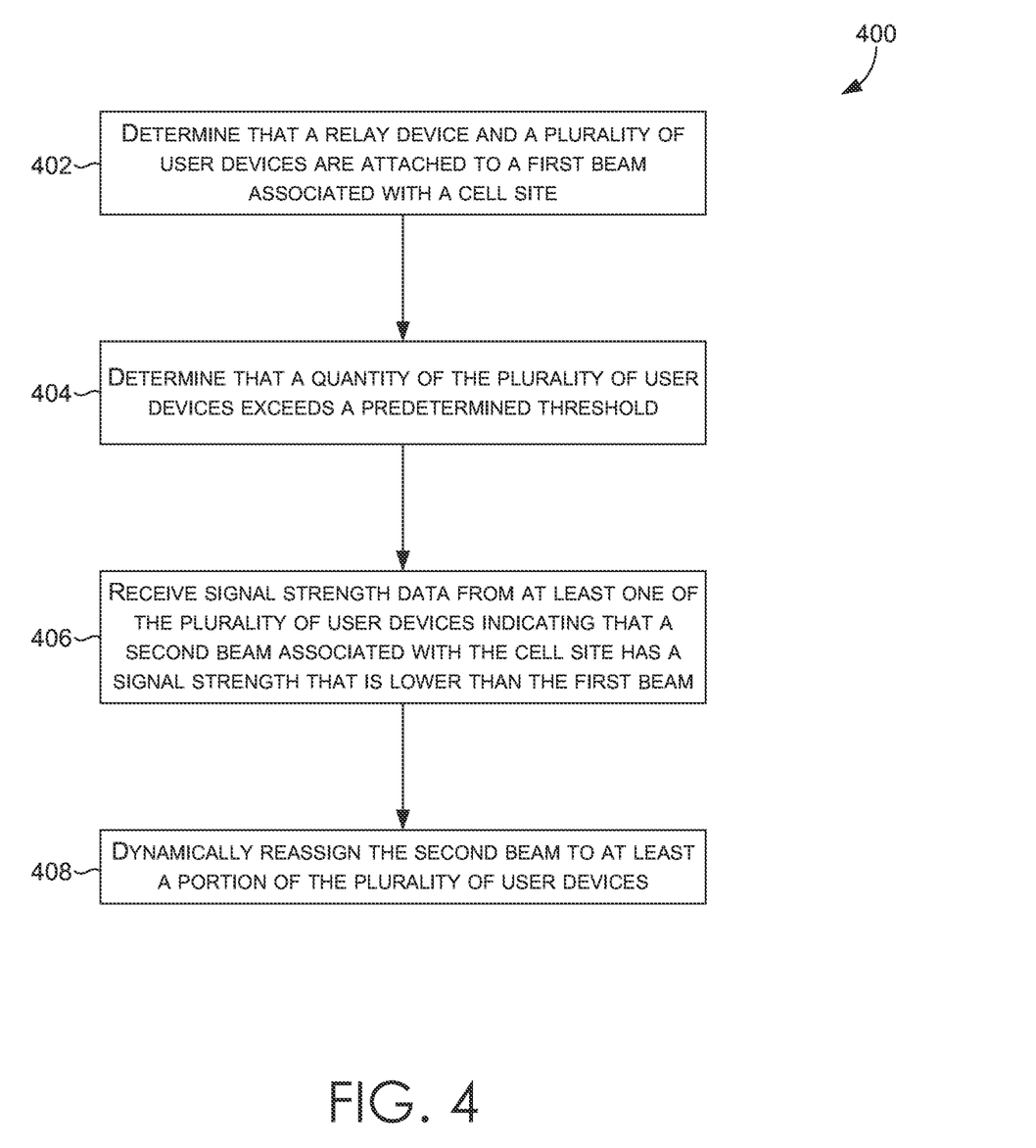

FIG. 4 depicts a flow diagram of an exemplary method 400 for dynamically allocating SSB beams, in accordance with aspects herein. At block 402, it is determined that a relay device and a plurality of user devices are attached to a first beam associated with a cell site. In aspects, there are multiple beams associated with the cell site. At block 404, it is determined that a quantity of the plurality of user devices exceeds a predetermined threshold. At block 406, signal strength data is received from at least one of the plurality of user devices indicating that a second beam associated with the cell site has a signal strength that is lower than the first beam. In some instances, the user device may already know that the signal strength of the second beam is lower than the first beam, but in other instances, the user device may just send signal strength information of the second beam and the network would determine whether it is lower or higher than the first beam's signal strength. At block 408, the second beam is dynamically reassigned to at least a plurality of the user devices. In some cases, all user devices are reassigned to the second beam, but in other aspects, just a portion of the user devices are reassigned to the second beam so that the quantity of user devices still using the first beam is below the predetermined threshold. In aspects, user devices currently using the first beam may only be assigned to user the second beam is the difference in signal strength between the first and second beams is below a threshold amount.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, power supply 514, and radio 516. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 8708 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for dynamically allocating synchronized signal block (SSB) beams, the system comprising:
    a processor; and
    one or more computer storage hardware devices storing computer-usable instructions that, when used by the processor, cause the processor to:
    determine that a relay device and a plurality of user devices are communicating with a cell site by way of a first beam;
    determine that a quantity of user devices of the plurality of user devices exceeds a predetermined threshold;
    identify a second beam that has a signal strength that is lower than the first beam, wherein a difference between the signal strength of the first beam and the signal strength of the second beam is below a predetermined amount; and
    dynamically reassign the second beam to at least a portion of the plurality of user devices.

2. The system of claim 1, wherein the first beam and the second beam are associated with a same cell site.

3. The system of claim 1, wherein the relay device is a small cell.

4. The system of claim 3, wherein the relay device and the plurality of user devices are capable of communicating using 5G.

5. The system of claim 1, wherein the identification of the second beam that has the signal strength that is lower than the first beam further comprises receiving signal strength data from at least one of the plurality of user devices indicating that the second beam has a lower signal strength than the first beam.

6. The system of claim 1, wherein the relay device is not reassigned to the second beam.

7. The system of claim 1, wherein the first beam and the second beam are SSB beams.

8. The system of claim 1, wherein the relay device consumes more network resources than each user device of the plurality of user devices.

9. A method for dynamically allocating synchronized signal block (SSB) beams, the method comprising:
    determining that a relay device and a plurality of user devices are communicating with a cell site by way of a first beam;
    determining that a quantity of user devices of the plurality of user devices exceeds a predetermined threshold;
    identifying a second beam that has a signal strength that is lower than the first beam;
    determining that a difference between a signal strength of the first beam and the signal strength of the second beam is below a predetermined amount; and
    dynamically reassigning the second beam to at least a portion of the plurality of user devices while maintaining communications with the relay device by way of the first beam.

10. The method of claim 9, wherein the relay device and the plurality of user devices are capable of communicating using 5G.

11. The method of claim 9, wherein the relay device is a small cell.

12. The method of claim 9, wherein identifying that the second beam that has the signal strength that is lower than the first beam further comprises receiving signal strength data from at least one of the plurality of user devices indicating that the second beam has a lower signal strength than the first beam.

13. The method of claim 9, wherein the relay device consumes more network resources than each user device of the plurality of user devices.

14. The method of claim 9, wherein the relay device is not reassigned to the second beam.

15. A method for dynamically allocating synchronized signal block (SSB) beams, the method comprising:
    determining that a relay device and a plurality of user devices are attached to a first beam associated with a cell site;
    determining that a quantity of user devices of the plurality of user devices exceeds a predetermined threshold;
    receiving signal strength data from at least one of the plurality of user devices indicating that a second beam associated with the cell site has a signal strength that is lower than the first beam, wherein a difference between the signal strength of the first beam and the signal strength of the second beam is below a predetermined amount; and
    dynamically reassigning the second beam to at least a portion of the plurality of user devices.

16. The method of claim 15, wherein the relay device and the plurality of user devices are capable of communicating using 5G.

17. The method of claim 15, wherein the relay device is a small cell.

18. The method of claim 15, wherein the second beam is assigned to all of the plurality of user devices.

19. The method of claim 15, wherein the relay device consumes more network resources than each user device of the plurality of user devices.

20. The method of claim 15, wherein the relay device is not reassigned to the second beam.

* * * * *